United States Patent [19]

Basa

[11] Patent Number: 4,628,538

[45] Date of Patent: Dec. 9, 1986

[54] TELEVISION TRANSMISSION SYSTEM USING OVERMODED WAVEGUIDE

[75] Inventor: Laddie A. Basa, Claremont, Calif.

[73] Assignee: Andrew Corporation, Orland Pk., Ill.

[21] Appl. No.: 733,707

[22] Filed: May 13, 1985

[51] Int. Cl.$^4$ .............................................. H04B 1/04

[52] U.S. Cl. ...................................... 455/91; 455/129; 455/124; 333/211

[58] Field of Search .................... 455/81, 91, 124, 129; 358/186; 333/135, 208, 211, 212

[56] References Cited

U.S. PATENT DOCUMENTS

| | | | |
|---|---|---|---|
| 2,535,067 | 12/1950 | Hope | 455/129 |
| 2,682,610 | 6/1954 | King | 455/81 |
| 2,950,452 | 8/1960 | Marcatili | 333/208 |
| 3,421,086 | 1/1969 | Medford et al. | 455/81 |
| 3,916,352 | 10/1975 | Powell | 333/211 |
| 4,544,901 | 10/1985 | Rhodes | 333/212 |

*Primary Examiner*—Jin F. Ng
*Attorney, Agent, or Firm*—Leydig, Voit & Mayer

[57] ABSTRACT

A television transmission system for transmitting UHF signals from a UHF signal generator, the system comprising an antenna for radiating UHF signals generated by said UHF signal generator, an overmoded section of waveguide for carrying the signals at least part of the way between the UHF signal generator and the antenna with a low level of power loss, and a high-power mode filter coupled between the antenna and the overmoded section of waveguide. The filter comprises an overmoded waveguide section for propagating the signals in both a desired mode and undesired higher order modes; an undermoded waveguide section coupled to the overmoded section for propagating the signals only in the desired mode, the transition between the overmoded and undermoded waveguide sections in the high-power mode filter reflecting the higher-order-mode signals into the overmoded section; at least one pair of resonant slots formed in opposing walls of the overmoded section for coupling the higher-order-mode signals out of the transmission system; a pair of side-arm waveguides for receiving the higher-order-mode signals from the slots and for dissipating the higher-order-mode signals.

10 Claims, 10 Drawing Figures

TELEVISION TRANSMISSION SYSTEM USING OVERMODED WAVEGUIDE

FIELD OF THE INVENTION

This invention relates to television transmission systems using overmoded waveguide and, more particularly, to an improved mode filter for filtering unwanted modes from such systems.

BACKGROUND OF THE INVENTION

Although overmoded waveguides are generally recognized as undesirable in microwave systems, they are nevertheless often used to minimize losses in many modern microwave systems such as television transmission systems. This use of overmoded waveguides presents a problem, however, in that such waveguides allow the propagation of higher order modes of the desired signal which is typically propagated in the dominant mode, such as the $TE_{11}$ mode in circular waveguide systems. The higher-order modes are undesirable because they give rise to a group delay problem. Thus, at the ends of an overmoded section of waveguide, certain of the higher-order modes are reconverted to the desired mode, but only after they have traveled through the overmoded waveguide at different velocities. Because the different modes travel at different velocities, the signals reconverted to the desired mode are not in phase with the original signal in that same mode. This problem becomes more serious as the length of the overmoded waveguide is increased, and in many applications such as television transmission systems the overmoded section of waveguide may be hundreds or thousands of feet in length.

For low power applications, internal absorptive filter elements can be used to alleviate the moding problems. Unfortunately, such filters are impractical for high-power applications such as UHF television transmission systems (which typically operate at power levels of at least 30 kilowatts), as the power absorbed may exceed the power absorption capacity of the filter. Furthermore, it is difficult to raise the capacity of such filters by increasing the size of the filter elements because the size required to filter the undesired-mode signals in high-power applications would necessarily interfere with the desired signals propagating in the dominant mode.

SUMMARY OF THE INVENTION

It is therefore a primary object of the present invention to provide an improved television transmission system which will selectively filter out unwanted higher-order modes in high-power waveguide systems without significantly interfering with signals in the desired mode.

It is another important object of this invention to provide such an improved transmission system which does not require the use of internal absorptive filter devices.

A further object of the invention is to provide an improved television transmission system having an improved high-power mode filter type which can be economically fabricated, installed and maintained.

Other objects and advantages of the invention will become apparent upon reading the following detailed description and upon reference to the drawings.

DESCRIPTION OF THE PREFERRED EMBODIMENT

Figure 1:
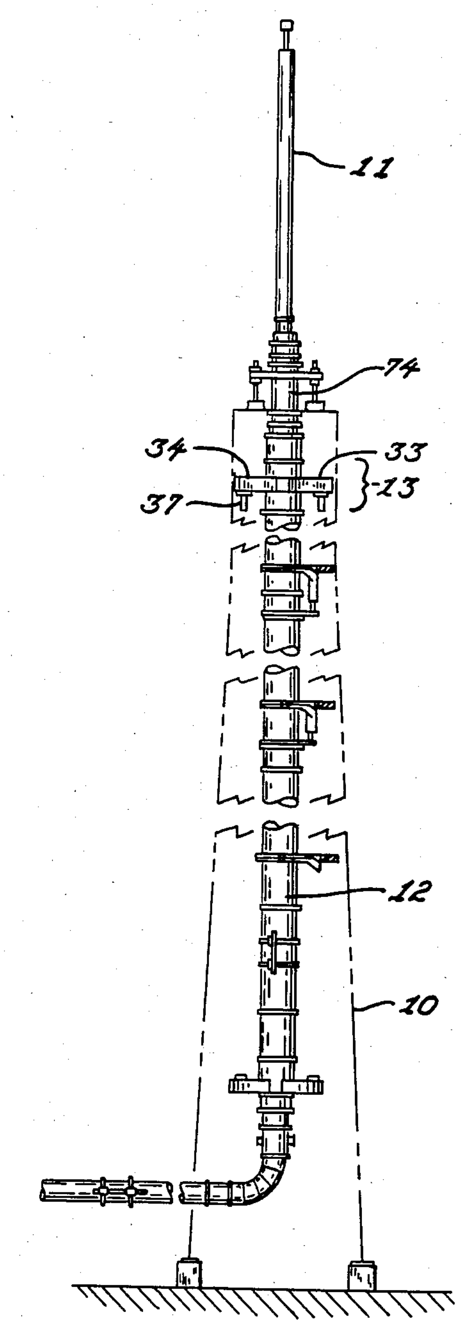
FIG. 1 is a side elevation of a UHF-TV transmission system embodying the present invention.
Figure 2:
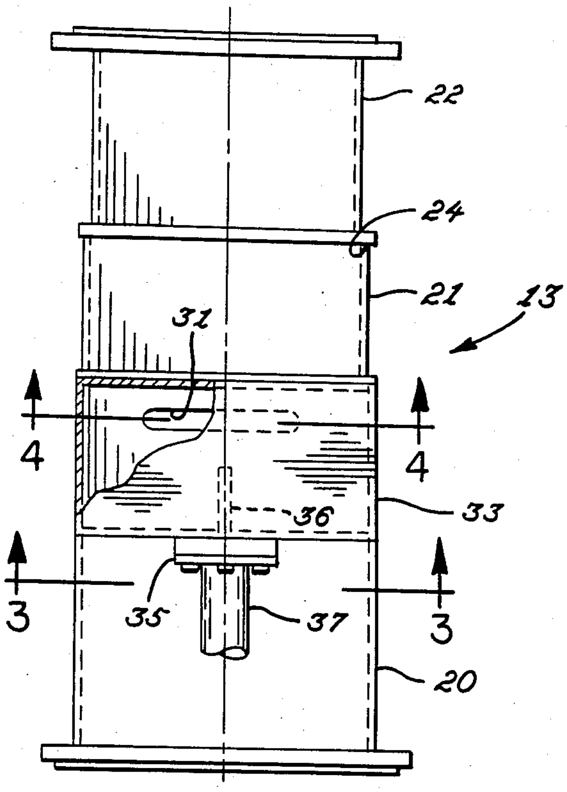
FIG. 2 is an enlarged side elevation, partially in section, of one embodiment of the mode filter shown in FIG. 1.
Figure 3:
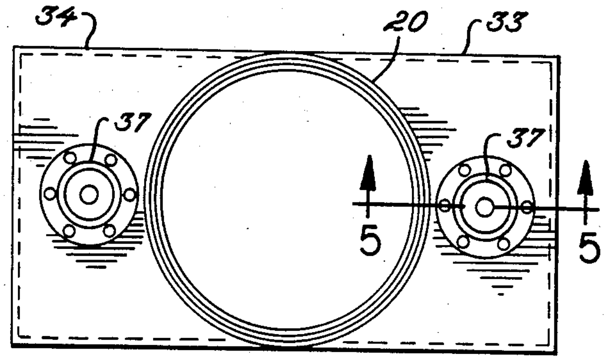
FIG. 3 is a section taken generally along line 3—3 in FIG. 2.
Figure 4:
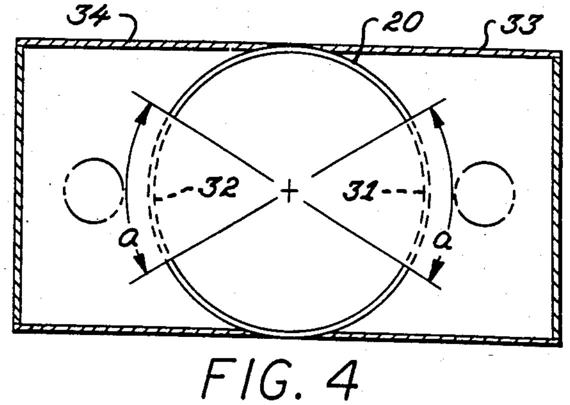
FIG. 4 is a section taken generally along line 4—4 in FIG. 2.
Figure 5:
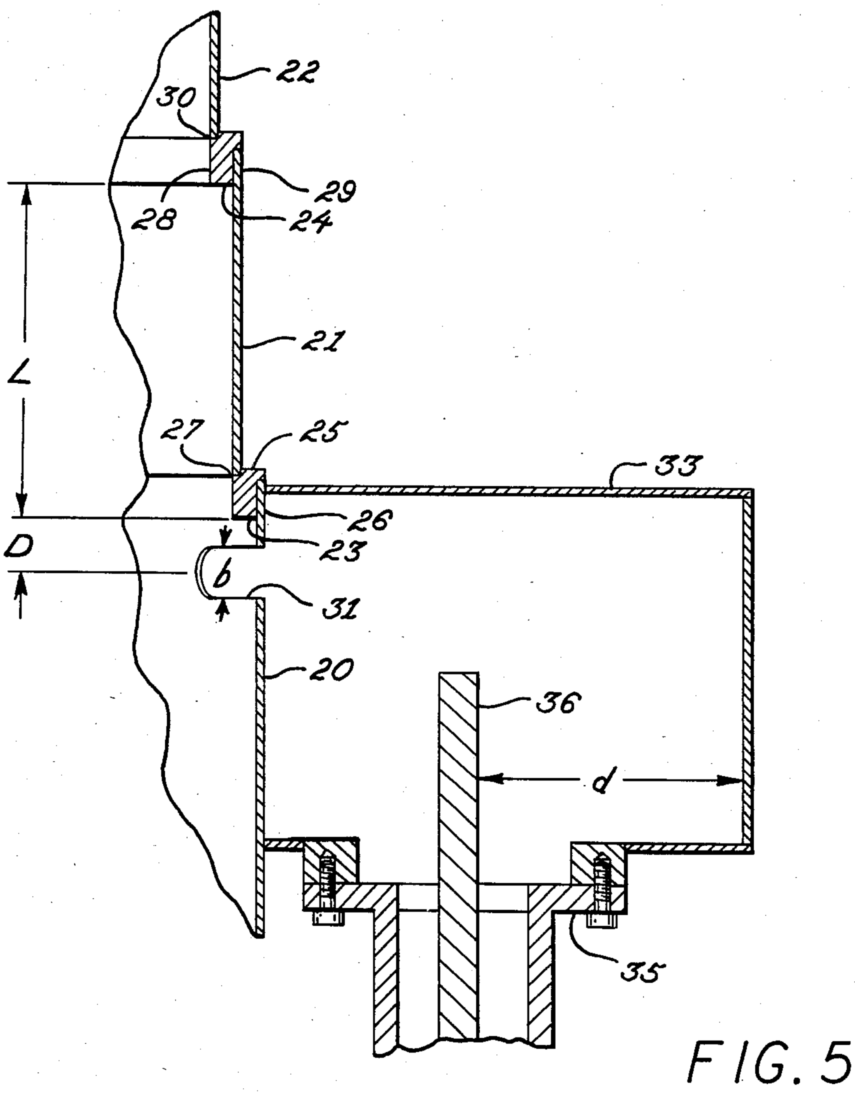
FIG. 5 is an enlarged section taken along line 5—5 in FIG. 3.

While the invention is susceptible to various modifications and alternative forms, certain specific embodiments thereof have been shown by way of example in the drawings and will be described in detail herein. It should be understood, however, that it is not intended to limit the invention to the particular embodiments disclosed, but, on the contrary, the intention is to cover all modifications, equivalents, and alternatives falling within the spirit and scope of the invention as defined by the appended claims.

Referring now to FIG. 1, an antenna tower 10 supports a conventional broadcast antenna 11 for transmission of UHF-TV signals. Towers of this type can be as high as 2000 feet. The antenna 11 is supplied with electromagnetic signals through a circular waveguide system which includes a long overmoded waveguide section 12 running up the tower. The waveguide section 12 is overmoded so that losses which would otherwise occur in the long vertical run are reduced. Because the waveguide section 12 is overmoded, however, signals excited in unwanted higher order modes, e.g. the $TM_{01}$ mode, may be propagated therein.

In order to filter unwanted higher-order-mode signals from the overmoded waveguide section 12, a mode filter 13 is connected between the upper end of the overmoded section 12 and the antenna 11. The lower end of the mode filter 13 has an inside diameter which matches that of the overmoded waveguide section 12, while the top end of the filter 13 has a smaller inside diameter to match that of an undermoded circular waveguide 14 leading to the antenna 11, or a transition to another size or type of waveguide or transmission line to adapt to the antenna input. All signals, including those propagated in the desired $TE_{11}$ mode as well as those propagated in the $TM_{01}$ mode, enter the lower end of the filter, but only signals propagating in the dominant $TE_{11}$ mode exit the filter 13 through its upper end.

In accordance with one important aspect of the present invention, the mode filter comprises a transition between the overmoded and undermoded sections of the waveguide system for reflecting undesired higher-order-mode signals into the overmoded section; at least one pair of resonant slots formed in opposing walls of the overmoded section for coupling the higher-order-mode signals out of the waveguide system carrying the desired-mode signals; a pair of side-arm waveguides for receiving the higher-order-mode signals from the slots; and means in the side-arm waveguides for dissipating the higher-order-mode signals.

This filter does not require the use of any absorptive devices within the main waveguide system which is carrying the desired-mode signals, and thus the filter has little or no deleterious effect on the desired-mode signals. By concentrating the unwanted higher-order-mode signals in the region of the coupling slots, the unwanted signals can be effectively removed from the main waveguide system and then dissipated externally of that system. With proper design of the coupling slots and the transistion between the overmoded and undermoded waveguide sections, the desired-mode signals suffer little or no adverse effect from the internal discontinuities required to remove the unwanted signals.

In the illustrative embodiment of the filter 13 shown in FIGS. 2–5, the filter has an overmoded lower section 20, an undermoded upper section 22, and an intermediate section 21. Internal transverse steps 23 and 24 are formed at the intersections of the three sections 20–22, thereby forming a stepped transformer which concentrates reflected signals propagating in the $TM_{01}$ mode in a known region of the overmoded waveguide. It will be understood that a greater or smaller number of steps may be used for different applications. A greater number of steps may be useful in achieving a wider bandwidth, while the use of a single step has the advantage of being less costly.

In order to form a step 23 having the desired radial width, while at the same time joining the two waveguide sections 20 and 21, an annulus 25 is located between the two sections 20 and 21 at their interface. As can be seen most clearly in FIG. 5, the annulus 25 has a recess 26 which receives an end portion of the section 20 along the outer surface of the annulus, and a recess 27 which receives an end portion of the section 21 along the inner surface of the annulus. The depths of the two recesses 26 and 27 are equal to the respective thicknesses of the waveguide sections 20 and 21 to avoid any discontinuities other than the step 23 at the intersection of the two sections 20 and 21.

A similar annulus 28 is provided between the two sections 21 and 22. Thus, the upper end of the intermediate section 21 is seated in a recess 29 formed in the outer surface of the annulus 28, and the lower end of the top section 22 is seated in a recess 30 formed in the inner surface of the annulus 28. The lower surface of the annulus 28 forms the step 24.

The intermediate and upper sections 20 and 21 have inside diameters which are large enough to propagate the desired $TE_{11}$ mode therethrough, but small enough to cut off the unwanted $TM_{01}$ mode. Consequently, the unwanted $TM_{01}$ mode is reflected by the steps 23 and 24. For any given cross-sectional configuration, the upper limit on the cross-sectional dimension required to suppress the unwanted higher-order modes can be calculated by using the numerical method described in R. M. Bulley, "Analysis of the Arbitrarily Shaped Waveguide by Polynomial Approximation", *IEEE Transactions on Microwave Theory and Techniques,* Vol. MTT-18, No. 12, December 1970, pp. 1022–1028.

The longitudinal length L (FIG. 5) of the intermediate filter section 21 is approximately $\lambda_g/4$ and is a transformer matching dominant-mode impedances between the overmoded and undermoded sections 20 and 22, respectively.

The two slots 31 and 32 have the same dimensions and are symmetrical with respect to their major and minor axes. The major axes of the slots lie in a plane that is perpendicular to the axis of the filter so that the major axes of the slots cut across the wall currents of the $TM_{01}$ mode but not the dominant $TE_{11}$ mode. Thus, the slots 31 and 32 couple the unwanted $TM_{01}$ mode out of the main waveguide system into a pair of rectangular side-arm waveguide stub sections 33 and 34. The axial distance D (FIG. 5) from the centerline of the slots 31, 32 to the junction of the first undermoded section 21 is chosen so that the $TM_{01}$ signal reflected from the overmoded/undermoded junction will be reinforcing at the slots. Therefore, the distance D is preferably $n\lambda_g/2$ where n is zero or any whole integer. This distance D can be adjusted for maximum coupling of the $TM_{01}$ mode; the bandwidth will be a maximum when $n=0$ and will decrease as n increases. The slots excite the dominate $TE_{10}$ mode in the rectangular stub sections 33 and 34.

To optimize the coupling of the unwanted $TM_{01}$ signals outside the waveguide system, the circumferential length a of each slot (FIG. 4) is adjusted to be resonant at the operating frequency and, therefore, will be approximately $\lambda_o/2$. The width b of each slot (FIG. 5) is somewhat insensitive but is empirically adjusted to achieve optimum coupling of the $TM_{01}$ signal from the filter 13. As a starting point, the width b of the slot is generally $<20\%$ of its circumferential length a.

To absorb the unwanted higher-order-mode energy in the external side-arm stub sections 33 and 34, each of these stub sections receives a coaxial connector 35 having a probe 36 extending into the interior of the stub. The coaxial connector 35 leads to standard high-power coaxial loads 37 where the unwanted energy is dissipated as heat. The probe 36 is located a distance d (FIG. 5) from the end of the side-arm stub section so that the probe effectively couples the higher-order-mode energy into the coaxial load 37. The distance d typically is between $\frac{1}{8}$ to $\frac{1}{4}$ $\lambda_g$ and is adjusted to optimize coupling.

Figure 6:
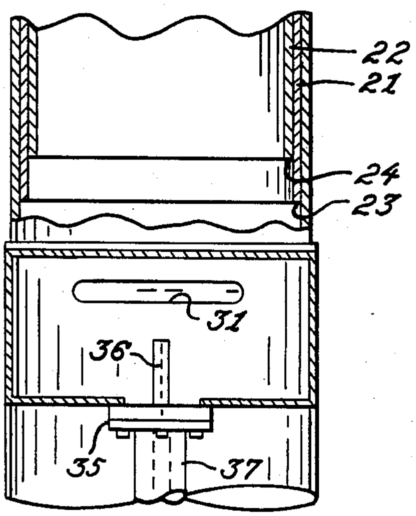
FIG. 6 is a side elevation similar to FIG. 2 but showing a modified embodiment of the mode filter.

In a modified embodiment of the filter 13 illustrated in FIG. 6, the internal steps 23 and 24 are formed by merely telescoping the three waveguide sections together. The bottom edges of the intermediate section 21 and the top section 22 then form the steps 23 and 24.

Figure 7:
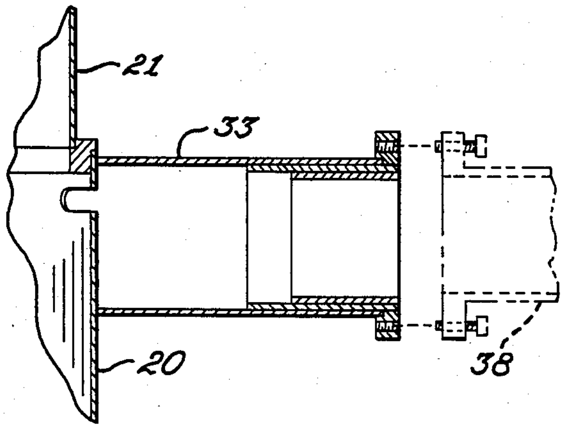
FIG. 7 is a sectional view similar to FIG. 5, on a reduced scale, showing a modified structure for the side-arm waveguides.

In another modified embodiment shown in FIG. 7, each of the rectangular side-arm sections contains an internal absorptive or resonant element (not shown) to absorb the undesired $TM_{01}$ energy. The element is still external to the main circular waveguide but internal to the aforementioned stub housing.

Figure 8:
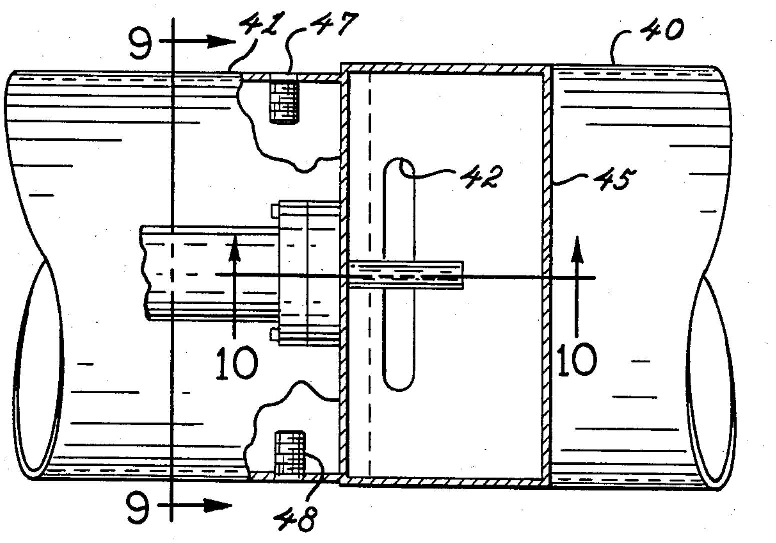
FIG. 8 is a side elevation, partially in section of a modified embodiment of a high-power mode filter suitable for use in the television transmission system of FIG. 1 in accordance with the invention.
Figure 9:
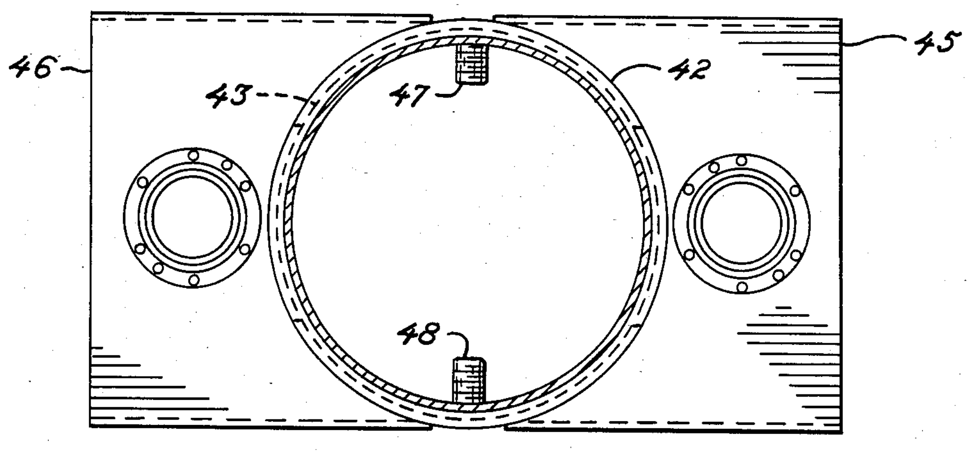
FIG. 9 is a section taken generally along line 9—9 in FIG. 8.
Figure 10:
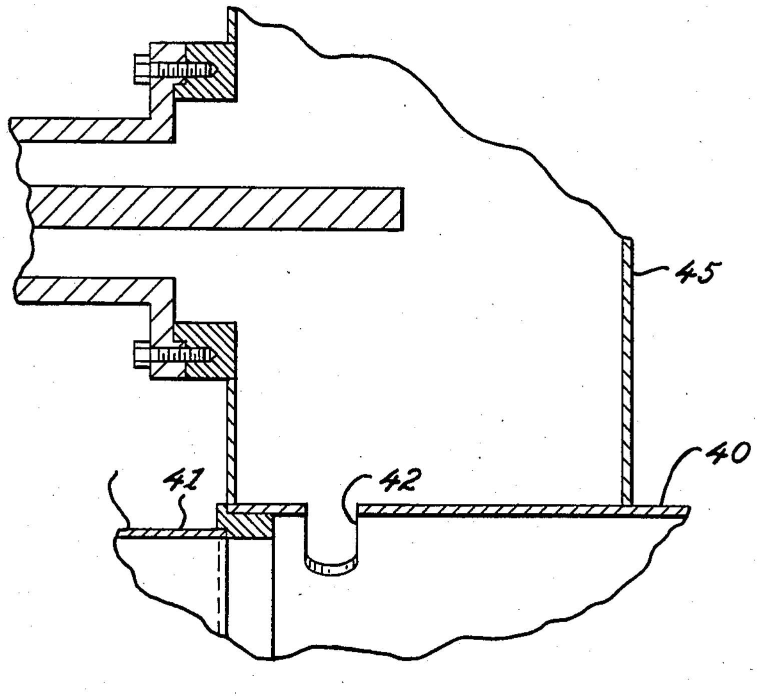
FIG. 10 is a section taken generally along line 10—10 in FIG. 8.

A further modified embodiment of the invention using only a single step between overmoded and undermoded waveguide sections 40 and 41 is illustrated in FIGS. 8–10. In this embodiment, slots 42 and 43 are formed in the overmoded waveguide section 40 and open into a pair of side-arm waveguide stub sections 45 and 46 similar to those described above. In order to change the dominant-mode VSWR, a pair of diametrically opposed tuning screws 47 and 48 are provided in the undermoded waveguide section 41, on a transverse axis that is orthogonal to a transverse axis passing through the centers of the slots 42 and 43. Locating the symmetrical tuning screws 45 and 46 in the undermoded waveguide section 40 avoids the excitation of undesired higher order modes by the screws.

As can be seen from the foregoing detailed description, the present invention provides an improved mode filter which selectively filters out unwanted higher-order modes in high-power waveguide systems without significantly interfering with signals in the desired mode. This improved high-power mode filter does not have or require the use of internal absorptive filter devices, and can be economically fabricated, installed and maintained.

What is claimed is:

1. A television transmission system for transmitting UHF signals from a UHF signal generator, said system comprising an antenna for radiating UHF signals generated by said UHF signal generator, an overmoded section of waveguide for carrying said signals at least part of the way between said UHF signal generator and said antenna with a low level of power loss, and a high-power mode filter coupled between the antenna and the overmoded section of waveguide comprising an overmoded waveguide section for propagating said signals in both a desired mode and undesired higher order modes, an undermoded waveguide section coupled to said overmoded section for propagating said signals only in said desired mode, the transition between said overmoded and undermoded waveguide sections reflecting said higher-order-mode signals into said overmoded section, at least one pair of resonant slots formed in opposing walls of said overmoded section for coupling said higher-order-mode signals out of the transmission system, a pair of side-arm waveguides for receiving said higher-order-mode signals from said slots, and means in said side-arm waveguides for dissipating said higher-order-mode signals.

2. A television transmission system as set forth in claim 1 wherein said transition comprises an intermediate waveguide section disposed between said overmoded and undermoded waveguide sections and forming at least one transverse step with each of said overmoded and undermoded sections, said steps being positioned and dimensioned to reflect said higher-order-mode signals into the region of said slots.

3. A television transmission system as set forth in claim 2 wherein said overmolded, intermediate and undermoded waveguide sections form a stepped transformer.

4. A television transmission system as set forth in claim 1 wherein said undermoded waveguide section includes symmetrical tuning means for tuning the desired-mode VSWR.

5. A television transmission system as set forth in claim 4 wherein said symmetrical tuning means comprises a pair of diametrically opposed tuning screws.

6. A television transmission system as set forth in claim 4 wherein said transition between said overmoded and undermoded waveguide sections is a single step.

7. A television transmission system as set forth in claim 1 wherein said slots are located a half wavelength, or a multiple thereof, from the end of said overmoded waveguide section closest to said undermoded section.

8. A television transmission system as set forth in claim 1 wherein the circumferential length of each of said slots is about a half wavelength.

9. A television transmission system as set forth in claim 1 wherein said desired mode is the $TE_{11}$ mode and the principal higher order mode is the $TM_{01}$ mode.

10. A television transmission system claim 1 wherein said means for dissipating said higher-order-mode signals comprises coaxial loads connected to said side-arm waveguides.

* * * * *